United States Patent
Lockwood et al.

(10) Patent No.: US 8,833,313 B2
(45) Date of Patent: Sep. 16, 2014

(54) GRILLE AIRFLOW SHUTTER SYSTEM WITH DISCRETE SHUTTER CONTROL

(75) Inventors: Thomas K. Lockwood, Fenton, MI (US); Darren L. Bohne, Fraser, MI (US); Michael G. Leffert, Howell, MI (US); Rajneesh K. Singh, Perry Hall, MD (US); Jason W. Guenzel, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1029 days.

(21) Appl. No.: 12/781,253

(22) Filed: May 17, 2010

(65) Prior Publication Data
US 2011/0281515 A1 Nov. 17, 2011

(51) Int. Cl.
*B60H 1/26* (2006.01)
*B60K 11/06* (2006.01)
*B60K 11/08* (2006.01)
*F01P 7/02* (2006.01)
*F01P 7/10* (2006.01)
*F01P 7/12* (2006.01)

(52) U.S. Cl.
CPC *F01P 7/12* (2013.01); *B60K 11/085* (2013.01)
USPC ....... 123/41.04; 62/133; 123/41.05; 165/202; 165/267; 165/269; 165/271; 180/68.1

(58) Field of Classification Search
CPC ................. F01P 7/12; F01P 7/26; F01P 7/10; F01P 11/10; B60K 11/085
USPC .......... 123/41.04, 41.05, 41.06, 41.07, 41.56; 165/202, 267, 269, 271; 180/68.1; 62/133
See application file for complete search history.

(56) References Cited

U.S. PATENT DOCUMENTS

| | | | | |
|---|---|---|---|---|
| 1,833,324 A * | 11/1931 | Kenneweg | ..................... | 237/2 A |
| 1,839,525 A * | 1/1932 | Bargar | ........................ | 123/41.04 |
| 1,924,654 A * | 8/1933 | Petersen | ......................... | 165/98 |
| 2,217,302 A * | 10/1940 | Agerell et al. | ................ | 180/68.1 |
| 2,591,392 A * | 4/1952 | Weiser | ............................. | 236/76 |
| 4,292,813 A * | 10/1981 | Paddock | .......................... | 62/158 |
| 4,756,279 A * | 7/1988 | Temmesfeld | .............. | 123/41.04 |
| 4,916,902 A * | 4/1990 | Pratt et al. | ........................ | 60/599 |
| 5,269,264 A * | 12/1993 | Weinhold | ................... | 123/41.05 |
| 5,566,745 A * | 10/1996 | Hill et al. | ....................... | 165/299 |
| 5,828,967 A * | 10/1998 | Ueda | ................................ | 701/1 |
| 6,142,108 A * | 11/2000 | Blichmann | ................ | 123/41.05 |
| 6,170,274 B1 * | 1/2001 | Ichishi et al. | ................... | 62/179 |
| 6,997,389 B2 * | 2/2006 | Demster | ...................... | 236/46 R |
| 2002/0121554 A1* | 9/2002 | Vaudry et al. | ................... | 236/34 |
| 2003/0101947 A1* | 6/2003 | Ries-Mueller | ............. | 123/41.05 |

(Continued)

FOREIGN PATENT DOCUMENTS

| | | |
|---|---|---|
| CN | 86102103 A | 9/1986 |
| CN | 201009735 Y | 1/2008 |
| DE | 102004034066 A1 | 2/2006 |
| DE | 102005034775 A1 | 11/2006 |

*Primary Examiner* — Stephen M Hepperle
*Assistant Examiner* — Frederick D Soski

(57) ABSTRACT

A method of controlling airflow through a grille on a front end of a vehicle comprising the steps of: detecting vehicle operating conditions; determining a desired percentage of airflow through the grille based on the desired operating conditions; actuating grille airflow shutters to an open position for the determined desired percentage of a predetermined time interval; and actuating the grille airflow shutter to a closed position for a remaining percentage of the predetermined time interval.

12 Claims, 3 Drawing Sheets

(56) References Cited

U.S. PATENT DOCUMENTS

| | | | |
|---|---|---|---|
| 2003/0221638 A1* | 12/2003 | Haase | 123/41.01 |
| 2004/0226764 A1* | 11/2004 | Iwasaki et al. | 180/68.1 |
| 2006/0095178 A1 | 5/2006 | Guilfoyle et al. | |
| 2008/0223317 A1* | 9/2008 | Shintani et al. | 123/41.05 |
| 2009/0050385 A1* | 2/2009 | Guilfoyle et al. | 180/68.1 |
| 2010/0083917 A1* | 4/2010 | Saida et al. | 123/41.04 |

\* cited by examiner

GRILLE AIRFLOW SHUTTER SYSTEM WITH DISCRETE SHUTTER CONTROL

BACKGROUND OF INVENTION

The present invention relates generally to vehicles having grille airflow shutters and more particularly to grille airflow shutter systems and methods of controlling such systems.

Grille airflow shutters are devices that control the amount of airflow through a front grille of a vehicle. The airflow control is typically based on cooling or warming needs for heat exchangers in a condenser, radiator, fan module (CRFM) located behind the grille. A greater airflow provides for better heat transfer out of the heat exchangers in the CRFM. When reduced or no airflow is desired, the grille airflow shutters are adjusted to block airflow through the grille, and, conversely, when additional air flow is desired the airflow shutters can be adjusted to allow full airflow through the grille.

Grille airflow shutters have been controlled using one of two methods. There are discrete open/shut shutters that only move between the open and shut positions, and the decision to open is based on reaching a particular temperature threshold, with the shutters remaining open continuously above this threshold, and the decision to close is based on dropping below this threshold, where the shutters remain continuously closed. However, this type of system provides less precise airflow control than is desired and may end up with repeated open/closed cycling if the temperature fluctuates around an open/close temperature threshold.

The other type of grille airflow shutter system overcomes the precision concern by using shutters that are variably controlled. That is, the shutters can be controlled to be in various positions of partial closure. With this control, the precise amount of airflow can be achieved by opening the shutters only the desired amount. These variable shutters are controlled with pulse width modulation. However, pulse width modulation, while allowing for the variable control of the shutters, adds significantly to both the cost of the physical hardware and to the complexity of the control algorithm and driver.

SUMMARY OF INVENTION

An embodiment contemplates a method of controlling airflow through a grille on a front end of a vehicle, the method comprising the steps of: detecting vehicle operating conditions; determining a desired percentage of airflow through the grille based on the desired operating conditions; actuating grille airflow shutters to an open position for the determined desired percentage of a predetermined time interval; and actuating the grille airflow shutter to a closed position for a remaining percentage of the predetermined time interval.

An embodiment contemplates a vehicle comprising a front end having a grille with grille openings therethrough; a condenser, radiator, fan module located behind the grille openings; and a grille airflow shutter system located proximate the grille openings, including shutters movable to selectively block airflow through the grille openings and including a discrete shutter actuator controllable to move the shutters between an open position and a closed position. The vehicle also includes a controller in communication with the discrete shutter actuator to move the shutters between the open position and the closed position, wherein the controller is configured to detect vehicle operating conditions; determine a desired percentage of airflow through the grille based on the desired operating conditions; actuate grille airflow shutters to an open position for the determined desired percentage of a predetermined time interval; and actuate the grille airflow shutter to a closed position for a remaining percentage of the predetermined time interval.

An advantage of an embodiment is that an effective variable airflow control is achieved in order to precisely control airflow through the grille while employing a discrete open/shut shutter actuator and controls, which minimizes the cost and complexity of the grille airflow shutter system. This grille airflow shutter system allows for overall improved fuel economy for the vehicle by reducing overall aerodynamic drag while still providing for airflow to the CRFM as needed. The aerodynamic improvements averaged over time can be essentially the same as with a variable pulse width modulated controller but without the cost and complexity. The modulated airflow through the grille can be precisely controlled to meet powertrain and air conditioning cooling requirements without requiring variable position shutters.

DETAILED DESCRIPTION

Figure 1:
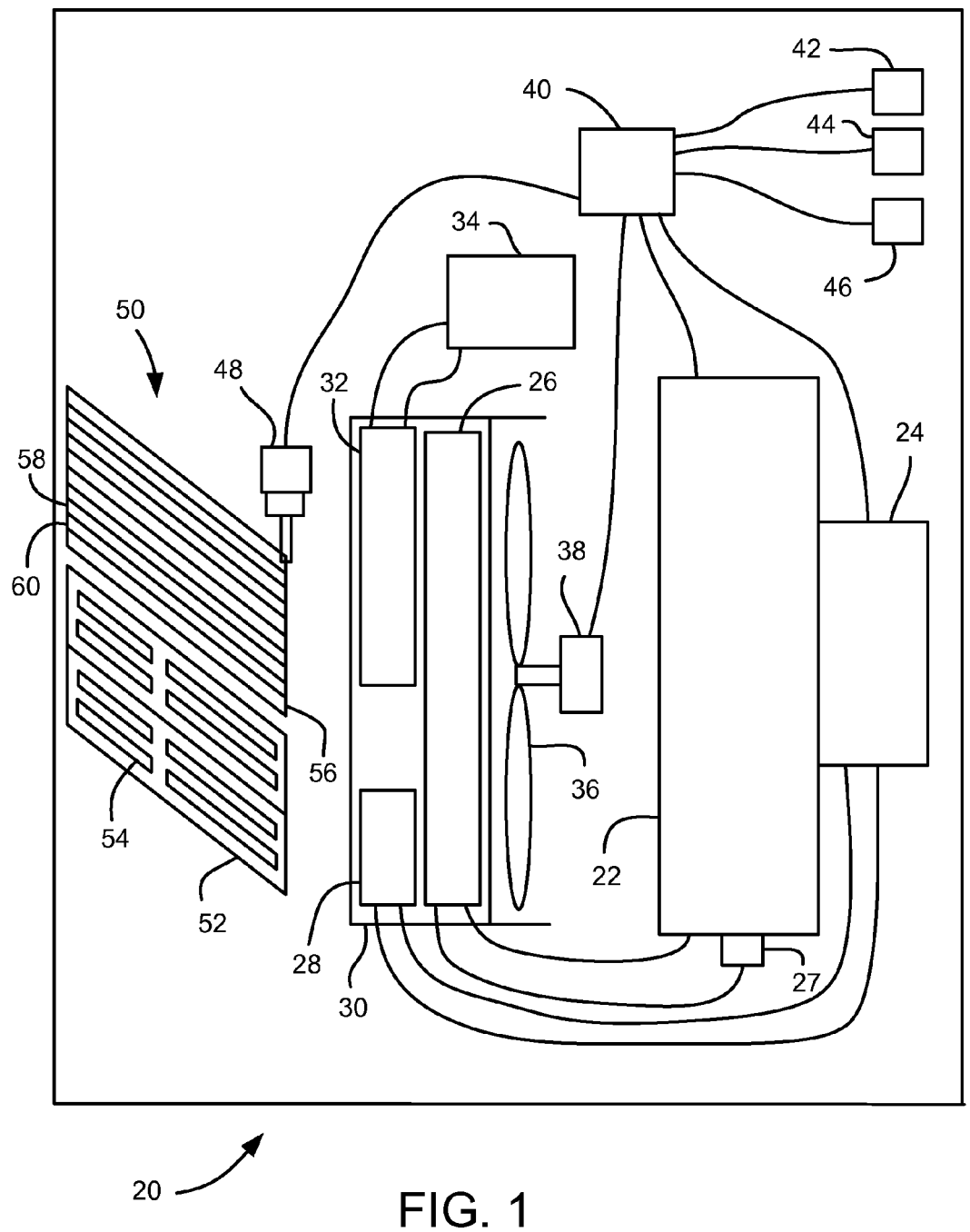
FIG. 1 is a schematic view of a vehicle including a grille airflow shutter system.

Referring to FIG. 1, a vehicle, indicated generally at 20, is shown. The vehicle 20 may include a power plant, such as an internal combustion engine 22, and transmission 24. Coolant pumped through a radiator 26 by a water pump 27 may be employed to cool the engine 22. Also, transmission oil may flow through a transmission oil cooler 28 to cool the transmission. The transmission oil cooler 28 and radiator 26 may be part of a condenser radiator, fan module (CRFM) 30, which may also include a condenser 32 of an air conditioning system 34. Other heat exchangers, for example, a powertrain electronics cooling heat exchanger (not shown), may also be part of the CRFM. The CRFM 30 may also include an engine fan 36 that may be driven by a motor 38.

One or more controllers 40 may be in communication with and control the engine 22 and transmission 24 as well as the air conditioning system 34 and motor 38. The controller 40 may be in communication with various sensors, such as, for example, an engine coolant temperature sensor 42, an air conditioning system pressure sensor 44, a transmission oil temperature sensor 46, as well as other sensors known to those skilled in the art. The controller 40 may be a single controller or multiple discrete controllers in communication with one another and may be various combinations of hardware and software as is known to those skilled in the art. The controller 40 may also be in communication with a discrete shutter actuator 48, which is part of a grille airflow shutter system 50.

The grille airflow shutter system 50 cooperates with a grille 52 mounted in the front of the vehicle 20 that has grille openings 54, which allow airflow through to the CRFM 30. The system 50 also includes grille airflow shutters 56 that mount adjacent to the grille 52 (shown above the grille 52 in FIG. 1 for clarity in showing the various elements). The grille airflow shutters 56 may include shutters 58 that can be selectively aligned with the grille openings 54 to block flow through the grille openings 54 and shutter openings 60 that can be selectively aligned with the grille openings 54 to allow airflow through the openings 54. The grille airflow shutters 56 may, for example, slide up and down to selectively allow and block airflow, with a discrete shutter actuator 48 that raises and lowers the grille airflow shutters 56, or they may rotate or pivot to selectively block and allow airflow, with a discrete shutter actuator that causes pivoting of the shutters 56.

The controller 40 and discrete shutter actuator 48 as defined in the present application cooperate to move the shutters 56 between one or the other of only two positions. That is, the grille airflow shutters 56 are either positioned to block all (or essentially all) airflow through the grille openings 54, a shutter closed position, or are positioned to allow full (or essentially full) airflow through the grille openings 54, a shutter open position. This binary shutter positioning allows for reduced cost and complexity because no variable or pulse width modulated actuator and actuator driver are needed—a simple on/off driver and a two position actuator are all that is required for grille airflow shutter control.

Figure 2:
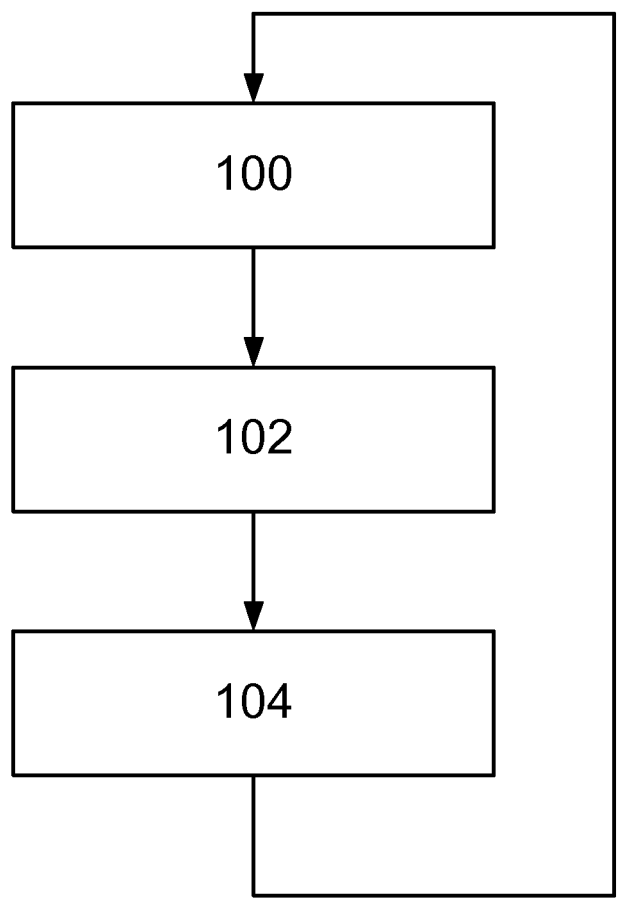
FIG. 2 is a flow chart illustrating a method of operating the grille airflow shutter system.

FIG. 2 illustrates a method of operating the grille airflow shutter system 50 for the vehicle shown in FIG. 1. Sensors detect the various operating conditions of vehicle components, block 100. For example, the controller 40 may read, among other things, the engine coolant temperature, the transmission oil temperature, and whether the air conditioning system is operating. Other readings, such as, for example, engine load, vehicle speed and ambient temperature may also be read. The vehicle speed may be applicable because the variable shutter operation may be used only at vehicle speeds above a predetermined speed threshold. For example, the predetermined speed threshold may be a speed in the range of forty-five to sixty kilometers per hour.

Based on the vehicle operating conditions, the controller 40 determines the desired percentage of flow through the grille openings 54, block 102. The controller 40 may employ a lookup table or other means to determine the desired percentage, with the lookup table based on the particular vehicle and powertrain combination. For example, the controller 40 may determine that a thirty-three percent airflow rate through the grille 52 is desired to achieve the appropriate thermal cooling.

After determining the desired percentage, the controller 40 actuates the discrete shutter actuator 48 to achieve the desired percentage, block 104. In the example given above, to achieve the thirty-three percent airflow rate, the discrete shutter actuator 48 may be actuated to move the grille airflow shutters 56 to the open position for ten seconds and then move the shutters 56 to the closed position for twenty seconds. The thirty second interval is just an example, and other predetermined intervals may be employed instead. If twenty percent airflow is required, the shutters may be opened for twelve seconds out of each minute. Thus, the discrete shutter actuation, while producing periods of full airflow and full blockage of airflow, in effect produces a variable airflow of the desired percentage needed for the particular vehicle conditions.

The process repeats itself since the controller 40 continually monitors the vehicle operating conditions. As a result, the controller 40 may detect a significant change in operating conditions while the grille airflow shutters 56 are going through a particular cycle of percentage open/shut time. In this case, the controller 40 may change the percentage open shut times in mid-cycle to account for this change. The end result though is that the shutters 56 are still controlled based on a percentage of time open and a corresponding percentage of time closed even if this percentage requires changing before the end of the previous cycle. In this way precise airflow control is achieved but with only a discrete shutter actuator 48 and corresponding control electronics.

Figures 3A, 3B:
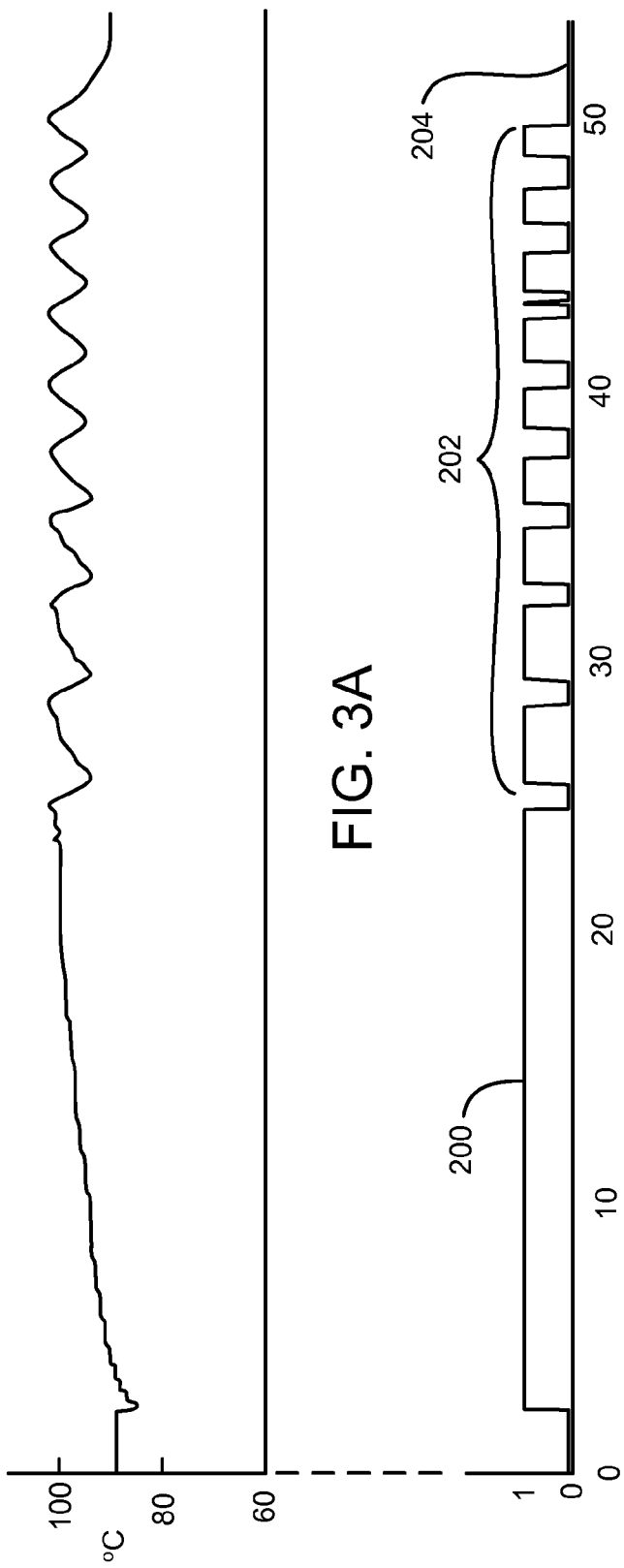
FIGS. 3A and 3B are graphs showing an example of operating the grille airflow shutter system and the resulting engine coolant temperature.

FIGS. 3A and 3B are graphs both having a corresponding time line for elapsed time (T) in minutes along the horizontal axis. FIG. 3A shows engine coolant temperature in degrees Celsius (° C.) along the vertical axis and FIG. 3B shows the binary open/closed position of the grille airflow shutter system 50, with level 0 being a shutter open position and level 1 being a shutter closed position. Initially, under a light engine load condition, the shutter position is switched to the shutter closed position 200. Under this condition, with the shutters closed, the engine coolant temperature slowly rises. As the cooling load increases the shutter pulses with increased frequency 202. The engine coolant temperature tends to rise and fall based on the open or closed position of the shutters. While the shutters may pulse with increasing frequency, the shutter position at any given time is based on the percentage of discrete open/closed shutter position as determined by the controller at that time. Under heavy load, the shutters remain open 204 to provide the needed cooling capacity for the engine coolant or other vehicle components needing this cooling capacity.

The overall thermal control may also have a threshold temperature of engine coolant where the controller activates the engine cooling fan to increase the airflow through the CRFM. For example, the engine fan may be activated if the engine coolant exceeds a predetermined temperature threshold. This further adds to the ability to maintain precise thermal control.

While certain embodiments of the present invention have been described in detail, those familiar with the art to which this invention relates will recognize various alternative designs and embodiments for practicing the invention as defined by the following claims.

What is claimed is:

1. A method of controlling airflow through a grille on a front end of a vehicle, the method comprising the steps of:
    (a) detecting vehicle operating conditions;
    (b) determining a desired percentage of airflow through the grille based on the detected operating conditions;
    (c) actuating grille airflow shutters to an open position for a determined desired percentage of a predetermined time interval based on the desired percentage of airflow through the grille when the percentage of the predetermined time interval is greater than zero percent and less than one hundred percent;
    (d) in conjunction with step (c), actuating the grille airflow shutters to a closed position for a remaining percentage of the predetermined time interval;
    (e) when the desired percentage of airflow through the grille is one hundred percent, actuating the grille airflow shutters to the open position for all of the predetermined time interval; and
    (f) when the desired percentage of airflow through the grill is zero percent, actuating the grille airflow shutters to the closed position for all of the predetermined time interval.

2. The method of claim 1 wherein step (a) is further defined by the vehicle operating conditions including detecting a vehicle speed, and steps (c) through (f) are further defined by actuating the grille airflow shutters based on the determined desired percentage of the predetermined time interval only when the vehicle speed is above a predetermined vehicle speed threshold.

3. The method of claim 1, wherein step (a) is further defined by detecting an engine coolant temperature, and the method includes step (g) activating an engine fan when the engine coolant temperature is above a predetermined engine coolant temperature threshold.

4. The method of claim 1 wherein step (a) is further defined by one of the vehicle operating conditions being engine coolant temperature.

5. The method of claim 1 wherein step (a) is further defined by one of the vehicle operating conditions being whether the air conditioning system is on or off.

6. The method of claim 1 wherein steps (c) and (d) are further defined by the predetermined time interval being thirty seconds.

7. The method of claim 1 wherein steps (c) through (f) are further defined by the actuating of the grille airflow shutters including actuating a discrete shutter actuator to move the grille airflow shutters between the open position and the closed position.

8. The method of claim 1 wherein step (e) is further defined by: when the desired percentage of airflow through the grille is one hundred percent, actuating the grille airflow shutters to the open position for all of the predetermined time interval unless the detected vehicle operating conditions change during the predetermined time interval to change the desired percentage of airflow to less than one hundred percent in which event a subsequent predetermined time interval begins by employing steps (b) and (c).

9. The method of claim 1 wherein step (f) is further defined by: when the desired percentage of airflow through the grill is zero percent, actuating the grille airflow shutters to the closed position for all of the predetermined time interval unless the detected vehicle operating conditions change during the predetermined time interval to change the desired percentage of airflow to greater than zero percent in which event a subsequent predetermined time interval begins by employing steps (b) and (c).

10. A vehicle comprising:
a front end having a grille with grille openings therethrough;
a condenser, radiator, fan module located behind the grille openings;
a grille airflow shutter system located proximate the grille openings, including shutters movable to selectively block airflow through the grille openings and including a discrete shutter actuator controllable to move the shutters only between an open position and a closed position; and
a controller in communication with the discrete shutter actuator to move the shutters between the open position and the closed position, wherein the controller is configured to detect vehicle operating conditions; determine a desired percentage of airflow through the grille based on the detected operating conditions; actuate grille airflow shutters to the open position for the determined desired percentage of a predetermined time interval based on the desired percentage of airflow through the grille when the percentage of the predetermined time interval is greater than zero percent and less than one hundred percent; and actuate the grille airflow shutters to the closed position for a remaining percentage of the predetermined time interval when the percentage is greater than zero percent and less than one hundred percent.

11. The vehicle of claim 10 wherein the shutters are located behind the grille and the discrete shutter actuator is configured to linearly move the shutters between the open and closed positions.

12. The vehicle of claim 10 including an engine fan located adjacent to the condenser, radiator, fan module and in communication with the controller, wherein the controller is configured to activate the engine fan when the shutters are in the open position and an engine coolant temperature is above a predetermined temperature threshold.

* * * * *